(12) United States Patent
Koo

(10) Patent No.: US 6,889,048 B1
(45) Date of Patent: May 3, 2005

(54) CALL PROCESSING METHOD AND APPARATUS FOR EFFECTIVE QOS CONTROL IN MOBILE COMMUNICATION SYSTEM

(75) Inventor: Chang-Hoi Koo, Songnam (KR)

(73) Assignee: Samsung Electronics Co., Ltd. (KR)

( * ) Notice: Subject to any disclaimer, the term of this patent is extended or adjusted under 35 U.S.C. 154(b) by 700 days.

(21) Appl. No.: 09/711,590

(22) Filed: Nov. 13, 2000

(30) Foreign Application Priority Data

Nov. 13, 1999 (KR) .......................... 1999-50478

(51) Int. Cl.[7] .............................................. H04Q 7/20
(52) U.S. Cl. .................... 455/452.1; 455/512; 455/509; 455/436; 455/452.2; 455/450; 455/458; 455/437; 455/435.2; 455/435.3; 455/439; 455/442; 455/438; 370/331; 370/335; 370/350
(58) Field of Search ................................ 455/452, 450, 455/436, 458, 437, 439, 438, 444, 442, 435.3, 512, 435.2; 370/331, 335, 350

(56) References Cited

U.S. PATENT DOCUMENTS

| | | | |
|---|---|---|---|
| 5,615,249 A | | 3/1997 | Solondz ........................ 379/58 |
| 5,884,174 A | * | 3/1999 | Nagarajan et al. .......... 455/436 |
| 5,966,664 A | | 10/1999 | Hiramatsu et al. .......... 455/515 |
| 6,031,827 A | * | 2/2000 | Rikkinen et al. ........... 370/330 |
| 6,061,559 A | * | 5/2000 | Eriksson et al. ......... 455/435.3 |
| 6,131,029 A | * | 10/2000 | Roberts ...................... 455/438 |
| 6,141,554 A | * | 10/2000 | Choi .......................... 455/436 |
| 6,192,248 B1 | * | 2/2001 | Solondz ...................... 455/450 |
| 6,205,128 B1 | * | 3/2001 | Le ............................. 370/331 |
| 6,205,336 B1 | * | 3/2001 | Ostrup et al. ............... 455/444 |
| 6,215,782 B1 | * | 4/2001 | Buskens et al. ............ 370/350 |
| 6,219,343 B1 | * | 4/2001 | Honkasalo et al. ......... 370/335 |
| 6,233,455 B1 | * | 5/2001 | Ramakrishna et al. ...... 455/437 |
| 6,249,681 B1 | * | 6/2001 | Virtanen .................... 455/466 |
| 6,334,052 B1 | * | 12/2001 | Nordstrand ................. 455/411 |
| 6,493,555 B2 | * | 12/2002 | Saada et al. ................ 455/438 |

FOREIGN PATENT DOCUMENTS

EP          0 994 604 A2     4/2000

* cited by examiner

*Primary Examiner*—Marceau Milord
(74) *Attorney, Agent, or Firm*—Dilworth & Barrese, LLP (57) ABSTRACT

A call processing method and apparatus for effective QoS (Quality of Service) control in a mobile communication system is provided. In one embodiment of the present invention, a base station checks available resources upon receipt of a call set-up request from a mobile station. If the resources are not enough to satisfy the QoS of the requested call, the base station suspends a call in progress with a lower service level than that of the requested call. Later, if available resources are secured, the base station resumes the suspended call.

23 Claims, 7 Drawing Sheets

FIG. 1A

"SERVICE LEVEL OF CALL FOR MOBILE STATION 1
< SERVICE LEVEL OF CALL FOR MOBILE STATION 2"

"SERVICE LEVEL OF CALL FOR MOBILE STATION N
< SERVICE LEVEL OF CALL FOR MOBILE STATION 2"

| FIELD NAME | BITS |
|---|---|
| MESSAGE TYPE | 8 |
| GENERAL MESSAGE FIELDS | |
| WAITING DURATION FLAG | 1 |
| WAITING DURATION TIME | 8 |
| WAITING REASONS | 3 |
| USE TIME | 1 |
| ACTION TIME | 8 |

51 — MESSAGE TYPE
52 — GENERAL MESSAGE FIELDS
53 — WAITING DURATION FLAG / WAITING DURATION TIME
54 — WAITING REASONS
55 — USE TIME / ACTION TIME

FIG. 5

| FIELD NAME | BITS |
|---|---|
| MESSAGE TYPE | 8 |
| GENERAL MESSAGE FIELDS | |
| RE-ESTABLISHMENT DURATION FLAG | 1 |
| RE-ESTABLISHMENT DURATION TIME | 8 |
| USE TIME | 1 |
| ACTION TIME | 8 |

61 — MESSAGE TYPE
62 — GENERAL MESSAGE FIELDS
63 — RE-ESTABLISHMENT DURATION FLAG / RE-ESTABLISHMENT DURATION TIME
64 — USE TIME / ACTION TIME

CALL PROCESSING METHOD AND APPARATUS FOR EFFECTIVE QOS CONTROL IN MOBILE COMMUNICATION SYSTEM

PRIORITY

This application claims priority to an application entitled "Call Processing Method and Apparatus for Effective QoS control in Mobile Communication System" filed in the Korean Industrial Property Office on Nov. 13, 1999 and assigned Serial No. 99-50478, the contents of which are hereby incorporated by reference.

BACKGROUND OF THE INVENTION

1. Field of the Invention

The present invention relates generally to a call processing method and apparatus in a mobile communication system, and in particular, to a call processing method and apparatus for effective control of QoS (Quality of Service) in a mobile communication system.

2. Description of the Related Art

The conventional mobile communication systems that primarily support voice transmission are being replaced by new mobile communication systems that additionally provide packet data services, including high speed packet data service, moving picture transmission, and packetized voice service. These new mobile communication systems aim at providing multimedia services.

However, the new mobile communication systems cannot guarantee rapid and reliable services due to limitations in efficiently and responsively processing traffic, frequent handoffs, call set-up requests from specific mobile stations, and overload. In particular, it is not expected that QoS will be guaranteed through call control and efficient bandwidth management in an IMT-2000 (International Mobile Telecommunication-2000) system with increased packet data services.

For example, a base station in an IMT-2000 system manages resources to guarantee a call service requested by a mobile station within the coverage area of the base station. The IMT-2000 base station establishes the requested call for the mobile station after analyzing the characteristics of the call and carrying on negotiations for frequency assignment with the mobile station. If resources are available, the base station can connect the requested call and guarantee QoS. On the other hand, if resources are not available, the base station rejects the call set-up request even though the call has a higher priority than a current call in progress.

Accordingly, in order to guarantee QoS efficiently, there is need for an apparatus and method in which a base station can accept a call set-up request, even when there exists no available resources, if the requested call has priority over a current call in progress.

SUMMARY OF THE INVENTION

It is, therefore, an object of the present invention to provide a method and apparatus for efficiently controlling overload and guaranteeing QoS in a mobile communication system.

It is another object of the present invention to provide a method and apparatus for accepting a call set-up request and connecting the requested call, even when there are no available resources, if the call has service level priority over a current call in progress in a mobile communication system.

It is a further object of the present invention to provide a method and apparatus for efficiently managing bandwidth and generating related messages in a signaling layer for guaranteeing QoS.

To achieve the above objects, a base station checks available resources upon receipt of a call set-up request from a mobile station. If the resources are not enough to satisfy the QoS of the requested call, the base station suspends a call in progress with a lower service level than that of the requested call. If available resources are secured, the base station resumes the suspended call.

According to one aspect of the present invention, the base station determines the service level of a call upon receiving a call set-up request from a mobile station. If the base station does not have enough available resources to accommodate the requested call and the service level of the requested call is higher than that of at least one of the calls in progress (from other mobile stations), it suspends the call with the lower priority. If the base station secures enough resources to resume the suspended lower priority call while the higher priority call is being serviced, it resumes the suspended call.

According to another aspect of the present invention, the base station determines the service level of a call when it receives a call set-up request from a second mobile station. If the base station does not have enough available resources to accommodate the requested call and the service level of the requested call is higher than that of a call in progress from a first mobile station, it transmits a waiting message to the first mobile station. The first mobile station discontinues data transmission in response to the waiting message. The base station accepts the call set-up request and services the requested call of the second mobile station. If the base station secures enough resources to resume the suspended call while the requested call of second mobile station is being serviced, it transmits a reestablishment message to the first mobile station. The first mobile station resumes data transmission in response to the reestablishment message.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

In a mobile communication system according to the present invention, a base station, in order to efficiently control overload and guarantee QoS, determines a service level for each call whose establishment is requested by a mobile station, taking into account the characteristics of the call (mobile station priority and service priority) in order to efficiently utilize and assign resources, and accepts a new call set-up request by suspending another call in progress if there are no available resources and the requested call has a higher service level than the existing call in progress. Upon receiving a new call set-up request, if there are available resources, the base station services the requested call. On the contrary, if no resources are available, the base station suspends an existing call with a lower service level than the requested call and accepts the new call set-up request. To do so, the present invention suggests a novel call process as well as novel message formats for messages between the base station and the mobile station.

Figure 1A:
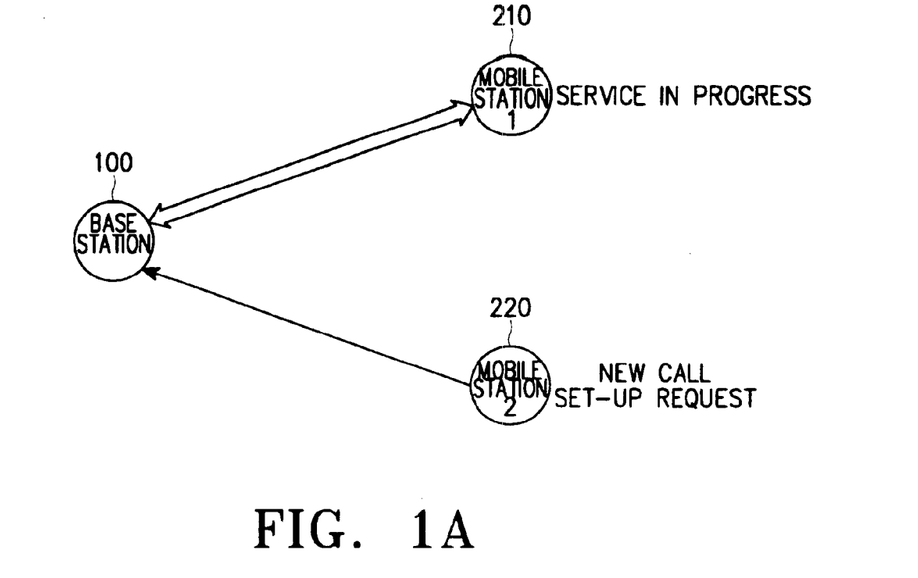
FIGS. 1A and 1B illustrate a call process according to an embodiment of the present invention.
Figure 1B:
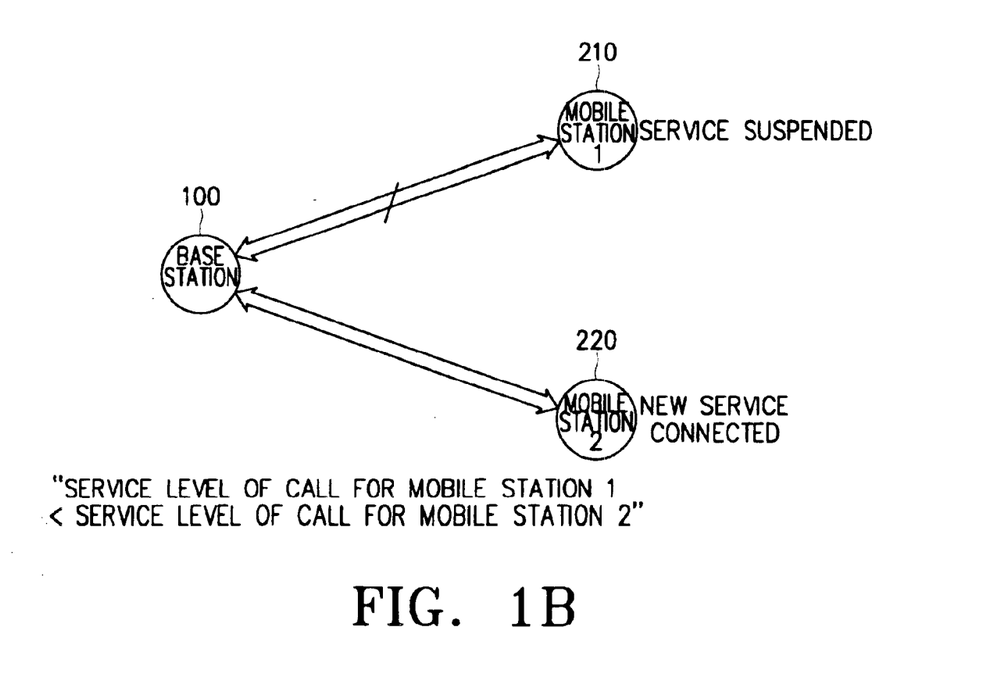

FIGS. 1A and 1B illustrate a call process according to an embodiment of the present invention. As an example, the call process occurs between a base station 100 and two mobile stations 210 and 220 within the cell radius of the base station 100.

The second mobile station 220 requests a new call set-up while the first mobile station 210 is being serviced as shown in FIG. 1A. If the base station 100 does not have enough available resources to accept the call set-up request, it determines the service level of the requested call and compares the determined service level with the service level of the call in progress from mobile station 210. If the service level of mobile station 220 is higher than the service level of mobile station 210, base station 100 drops the call in progress from the first mobile station 210 and connects the requested call from the second mobile station 220.

Figure 2A:
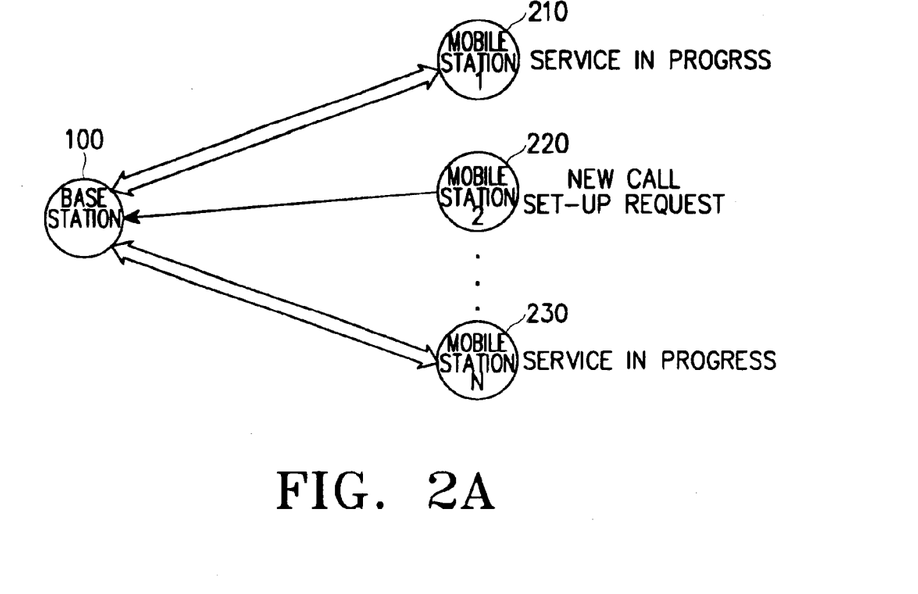
FIGS. 2A and 2B illustrate a call process according to another embodiment of the present invention.
Figure 2B:
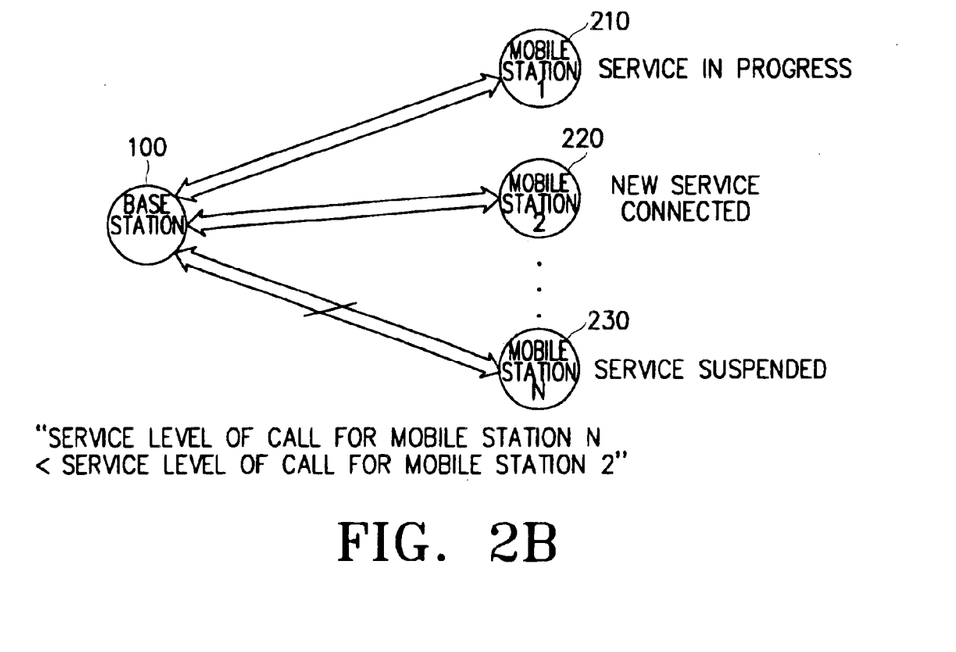

FIGS. 2A and 2B illustrate a call process according to another embodiment of kV the present invention. As an example, the call process occurs between base station 100 and a plurality of mobile stations 210 to 230 within the cell radius of the base station 100 in the second embodiment of the present invention.

As shown in FIG. 2A, the base station 100 receives a new call set-up request from the second mobile station 220 while servicing the first mobile station 210 and an ix. Nth mobile station 230. If the base station 100 has no resources available for the requested call, it determines the service level of the requested call and compares the determined service level with those of the calls in progress from the first mobile station 210 and the Nth mobile station 230. If the service level of the requested call is higher than the service level of at least one of the existing calls, the base station 100 drops the lower service level call service and connects the new call to the second mobile station 220. As shown in FIG. 2B, the call in progress from the Nth mobile station 230 has a lower service level than the call requested by the second mobile station 220 and, therefore, the base station 100 drops the call in progress from Nth mobile station 230 and connects the call requested by the second mobile station 220.

Figure 3:
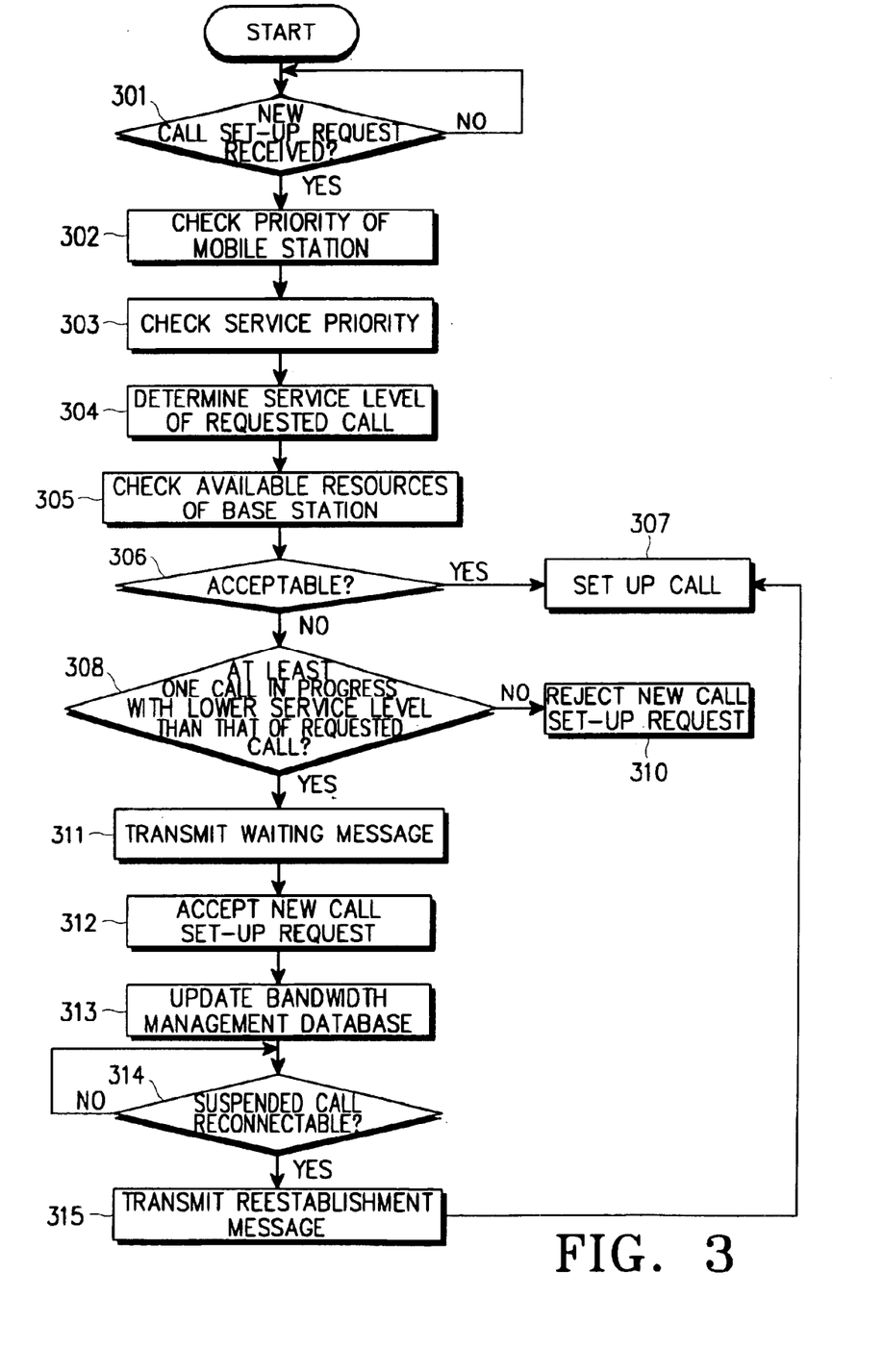
FIG. 3 is a flowchart illustrating an embodiment of a call set-up request accepting procedure in a base station according to the present invention.

FIG. 3 is a flowchart illustrating a call set-up request accepting procedure in the base station according to an embodiment of the present invention. In the call set-up request accepting procedure, upon receipt of a new call set-up request, the base station compares available resources with the resources required for the requested call, and suspends an existing call with a lower service level than the requested call if the available resources are not sufficient for the requested call. A waiting message and a reestablishment message are transmitted to the mobile station in the formats shown in FIGS. 5 and 6, respectively, when an existing call in progress is suspended using the procedure shown in FIG. 3.

Referring to FIG. 3, the base station determines whether a new call set-up request has been received from a mobile station in step 301. The mobile station cannot find out the status of resources in the base station from which it requests a call set-up. Upon receipt of the call set-up request, the base station determines the priority of the mobile station in step 302. The decision as to the mobile station priority can be made in many ways. For example, the base station determines whether the mobile station is a premium one, i.e., one which uses a service with high QoS at a relatively high charge, or an emergency one that transmits an emergency call, and then determines the service level of the mobile station. The mobile station priority (such as premium or emergency) depends only on the characteristics of the mobile station regardless of the service level and service option of the requested service. In contrast, a user can freely determine the service priority of his terminal (i.e., mobile station) according to what function he selects. In step 303, the base station determines the service priority of the requested service taking the characteristics of the requested application service into account. For example, services that the mobile station can request are classified into a voice service and a packet data service. The packet data service, in turn, is divided into a high speed packet data service, transmission of moving pictures, a packetized voice service, and a low speed file transmission service. The service priority decision is made according to the characteristics of the requested service such as traffic delay, loss rate, and throughput.

In step 304, the base station determines the service level of the requested call, considering both priorities determined in steps 302 and 303. The service level of the new call can be determined based on the priorities of steps 302 and 303 expressed in terms of indexes. The base station can use a database of the service levels of calls organized by mobile station priority and service priority. Based on the database, the base station can decide the service level of the requested call in many ways. The characteristics of a mobile station (mobile station priority) and the quality requirements of the requested application service (service priority) should be considered in determining the service level of the requested call in order to efficiently control QoS. Particularly, to efficiently assign and manage the bandwidth of the base station, the service level must be decided with full consideration given to the above-described characteristics. Therefore, steps 302, 303, and 304 must be performed accurately and effectively.

The base station computes resources required to satisfy the service level of the requested call, and determines, in step 306, whether to accept or reject the call set-up request after checking the magnitude of the current available resources in step 305. If the call set-up request is acceptable, the base station performs the call set-up process in step 307. A CDMA (Code Division Multiple Access) mobile communication system sets up the call based on the IS-95A/B standard, whereas an IMT-2000 mobile communication system, on the IS-2000 standard.

On the other hand, if it is determined, in step 306, that the call set-up request is to be rejected due to shortage or absence of available resources, the base station considers again whether to accept or reject the call set-up request in relation to the service level of the requested call in an embodiment of the present invention, as compared to a conventional transmission system where the call set-up request is simply denied. The base station determines whether there is at least one call in progress with a lower service level than that of the requested call in step 308. If the service level of the requested call is lower than or equal to any of the service levels of the calls in progress, the base station rejects the call set-up request in the same manner as a conventional mobile communication system, in step 310.

Figure 5:
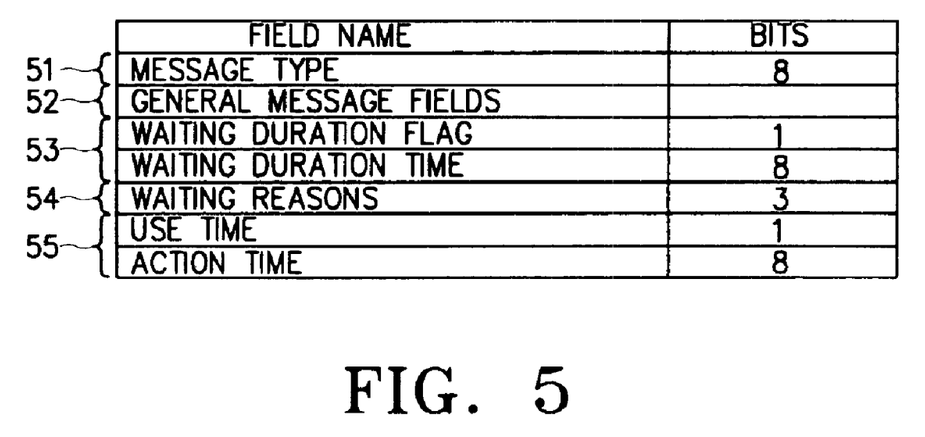
FIG. 5 illustrates the structure of a waiting message according to an embodiment of the present invention.

If there is a call in progress with a lower service level, which means that it can be suspended, the base station transmits a waiting message to the mobile station which has the lower service level call in progress, notifying the mobile station that the call in progress will be suspended in step 311 in anticipation of resuming the call in future. The waiting message may be transmitted to one or more mobile stations. FIG. 5 illustrates message fields of the waiting message according to an embodiment of the present invention.

Figure 4:
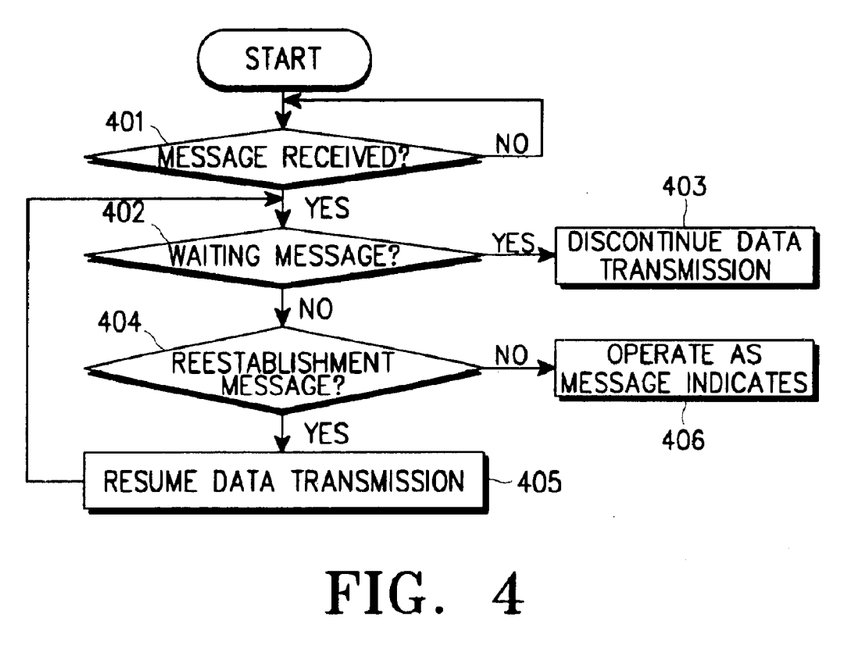
FIG. 4 is a flowchart illustrating a first embodiment of a message processing operation in a mobile station according to the present invention.

According to a first embodiment of a message processing operation in the mobile station, upon receipt of a waiting message, the mobile station operates using the procedure shown in FIG. 4. FIG. 4 will be described in great detail below. Although the mobile station suspends the call, it preserves parameters required to establish a physical channel and information about a service option indicative of the characteristics of the application service of the suspended call. The mobile station suspends data transmission until it either receives a reestablishment message indicating call reestablishment or resumes the service after a predetermined time period. The service resumption is determined by the fields of the message shown in FIG. 5 received from the base station.

In step 312, the base station assigns resources released from the suspended call to the requested call, accepts the call set-up request, and sets up the call in the same manner as step 307. The call set-up request can be accepted based on the IS-95° A./B standard or the IS-2000 standard as stated above.

The base station updates the bandwidth management database by calculating available resources after the acceptance of the call set-up request and the suspension of the existing call in step 313, to thereby flexibly and efficiently process possibly generated call set-up requests and manage the QoS of the calls in progress. While bandwidth management database updating may be done in many ways, the priorities of mobile stations, call characteristics (premium call, emergency call, handoff call, and reconnect call), and service characteristics (delay, loss rate, and gain rate), should first be fully considered from a quantitative point of view. In addition, it is necessary to have a method of preventing too many waiting messages from being sent to one destination in order to prevent too many service suspensions of a specific call. For this purpose, it is necessary to store a temporary holding index indicating the number of waiting messages transmitted to a specific mobile station in order to prevent a specific call, particularly a call with low service level, from being frequently dropped. Therefore, the base station must guarantee a minimum service, using the temporary holding index, when transmitting a waiting message.

In step 314, the base station determines whether the suspended call can resume after available resources are secured. If the service can be resumed, the base station transmits a reestablishment message to the corresponding mobile station in step 315. The reestablishment message is generated using a structure shown in FIG. 6.

In other embodiments, steps 314 and 315 may be omitted because there is an implicit agreement between the mobile station and the base station to resume the suspended call a predetermined time after the base station transmitted the waiting message to the mobile station.

FIG. 4 is a flowchart illustrating the first embodiment of the message processing operation in a mobile station according to the present invention. Upon receipt of the waiting message, the mobile station suspends data transmission temporarily and then, later on, resumes the service.

The mobile station receives a message in step 401 on a dedicated channel, during a call in progress. The mobile station determines the message type of the received message is in step 402. If it is a waiting message, the mobile station transmits a response message to the waiting message and suspends data transmission, thereby suspending the call in progress, in step 403. Transmission of the response message is optional though, in the preferred embodiments, it is done to prevent data loss. The base station and the mobile station can simultaneously suspend data transmission/reception at a point in time set in an Action Time field of the waiting message, as will be described later. Although data transmission is suspended temporarily, physical channel-associated parameters and service option-associated parameters are still maintained in the mobile station for rapid reconnection.

In step 404, the mobile station determines whether the received message is a reestablishment message. If the received message is not a reestablishment message, the mobile station concludes that the received message is not a message related with bandwidth control, but just a message receivable on a typical traffic channel, i.e., a dedicated channel, and operates as the message indicates. If it is determined that it is a reestablishment message in step 404, the mobile station resumes data transmission and thus removes the service from the suspension state in step 405. The mobile station and the base station can simultaneously resume data transmission/reception at a point in time set in the Action Time field of the reestablishment message. Use of fields that implicitly indicate service resumption obviates the need for steps 404 and 405 since data transmission will be resumed regardless of receipt of a reestablishment message.

FIG. 5 illustrates the format of a waiting message according to an embodiment of the present invention. Upon receipt of the waiting message, the mobile station suspends data transmission/reception and, thus, enters a service suspension state. The mobile station does not transmit a message requesting call reconnection until it receives a reestablishment message. This limits access attempts of the mobile station. As a result, mobile power is saved and interference with other channels is reduced. FIG. 5 illustrates only the message fields required by the preferred embodiment of the present invention, not all the message fields of the entire waiting message. On the one hand, a separate waiting message, carrying these waiting message fields, can be used as an additional traffic channel message. On the other hand, these waiting message fields may be inserted into a conventional message transmitted on a traffic channel, instead of being inserted into a separate waiting message.

Referring to FIG. 5, Message Type 51 is an 8-bit field that the mobile station analyzes first in the waiting message to determine what the received message is. General Message Fields 52 represents general fields for functions that a message transmitted on a traffic channel, i.e., a dedicated channel, performs. This bears no direct relation with the suggested function of the waiting message in the present invention. In the CDMA mobile communication system, fields specified according to the IS-95A/B or IS-2000 standard are General Message Fields 52.

Reference numeral 53 denotes the Waiting Duration Flag and the Waiting Duration Time field. If the one-bit Waiting Duration Flag field is set to 1, the mobile station suspends data transmission for the time period set in the Waiting Duration Time field upon receipt of the waiting message and then resumes data transmission without the need for a reestablishment message. To render this function viable, the service duration time of a current call in progress must be estimated, the call must be released at an expected time, and there must be enough available resources to allow the mobile station to resume data transmission. If the Waiting Duration Flag is set to 0, this indicates that the mobile station will receive the reestablishment message in order to resume the service. In this case, the Waiting Duration Time field is not used in the waiting message. In the preferred embodiment, an operator determines whether to set the Waiting Duration Flag to 1 or 0.

The Waiting Reasons field 54 is used by the base station to inform the mobile station of the reason why the call in progress is being suspended. The mobile station performs different actions depending on what the 3-bit Waiting Reasons field indicates. For example, the mobile station may display the reason for suspending the call in progress to the mobile station user using characters.

Reference numeral 55 denotes the Use Time and Action Time fields. If the Use Time field is set to 1, this indicates that an Action Time field of 8 bits is included. The Action Time field indicates an effective action time when the suspension state indicated by the waiting message comes into effect, and the base station and the mobile station simultaneously suspend data transmission/reception at this time. The Action Time field is used to reduce data loss during data transmission/reception. If the Use Time field is set to 0, the Action Time field is unused in the waiting message shown in FIG. 5.

Figure 6:
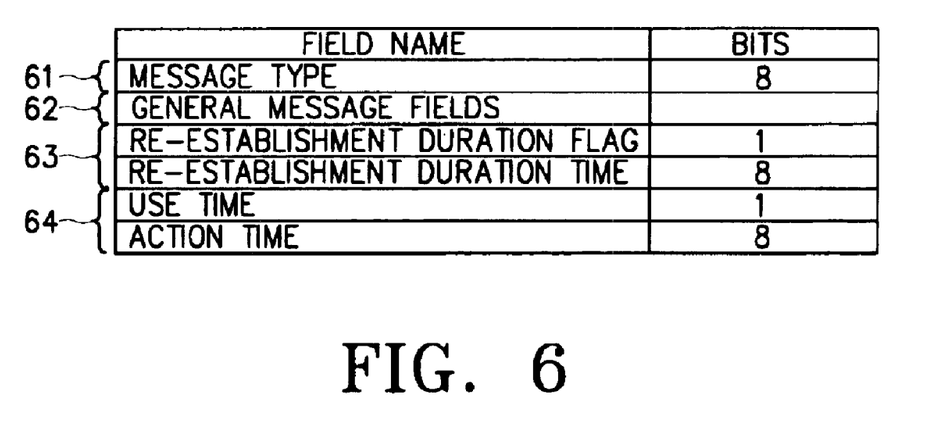
FIG. 6 illustrates the structure of a reestablishment message according to an embodiment of the present invention.

FIG. 6 illustrates the format of the reestablishment message according to the present invention. Upon receipt of the reestablishment message, the mobile station can resume data transmission using the physical channel-related parameters and the service option-related parameters that are set when the waiting message is received. As stated above, the mobile station cannot resume the service until it receives the reestablishment message when the Waiting Duration Flag in the waiting message is set to 0. The message fields shown in FIG. 6 are just the fields required for the reestablishment message to implement the function suggested in the present invention, and are not all the message fields in a complete reestablishment message. In addition, these message fields may be inserted into a conventional message transmitted on a traffic channel, instead of being inserted into a separate reestablishment message.

Referring to FIG. 6, the Message Type field is an 8-bit field that is analyzed when the mobile station receives the reestablishment message from the base station to determine the message type of the received message. General Message Fields 62 are general fields for functions that a message transmitted on a traffic channel, i.e., a dedicated channel, performs. These bear no direct relation with the suggested function of the reestablishment message in the present invention. In the CDMA mobile communication system, fields specified according to the IS-95A/B or IS-2000 standard are General Message Fields 52.

Reference numeral 63 denotes the Reestablishment Duration Flag and the Reestablishment Duration Time field. These fields indicate that the mobile station can resume message transmission after a predetermined time period, in cases where the mobile station cannot resume service after the time period set in the Waiting Duration Time field of a previously received waiting message due to a change of resources in the cell. The use of the two fields obviate the need for receiving another reestablishment message. If service resumption is not possible even after the time period set in Reestablishment Duration Time, the base station retransmits the reestablishment message with Reestablishment Duration Time set to a new value so that the mobile station may resume the service after the newly set time period. Only when the Reestablishment Duration Field is set to 1, is the Reestablishment Duration Time field used in the reestablishment message. On the other hand, if the Reestablishment Duration flag is set to 0, the Reestablishment Duration Time field is not used in the reestablishment message. That is, when the Reestablishment Duration flag is set to 0, the mobile station resumes the suspended call at the action time specified in the Aft reestablishment message shown in FIG. 6. The Reestablishment Duration Time field is not needed when the service duration time of a call in progress is estimated, the call is released at the expected time, and there are enough available resources to allow the mobile station to resume data transmission.

Reference numeral 64 denotes the Use Time and Action Time fields. If the Use Time field is set to 1, this indicates that in Action Time field of 8 bits is included. The Action Time field indicates an effective action time when the call is to be resumed and thus allows the base station and the mobile station to resume data transmission/reception at the same time. The Action Time field is used to reduce data loss during data transmission/reception. If the Use Time Field is set to 0, the Action Time field is unused in the reestablishment message of FIG. 6.

In the present invention, upon request of a new call set-up from a mobile station, the base station checks available resources. If there are not enough available resources to satisfy the QoS of the call, a call with a lower service level than the requested call is temporarily dropped, and the requested call is connected instead. To do so, the base station transmits a waiting message to the mobile station which has the lower service level call in progress. The mobile station with the suspended call can resume service upon receipt of a reestablishment message from the base station. FIG. 4 shows discontinuation of data transmission in response to the waiting message and service resumption in response to the reestablishment message in the mobile station. However, the mobile station can operate in different manners as shown in the different embodiments of FIGS. 7 and 8.

Figure 7:
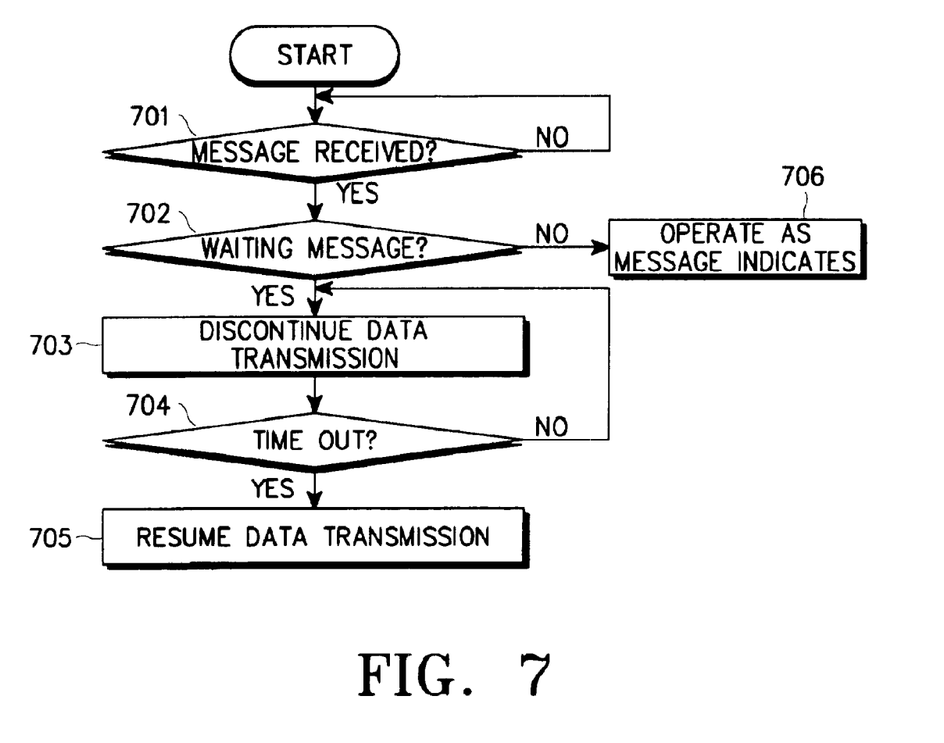
FIG. 7 is a flowchart illustrating a second embodiment of the message processing operation in the mobile station according to the present invention.

FIG. 7 is a flowchart illustrating a second embodiment of the message processing operation in the mobile station according to the present invention. This embodiment shows what happens when the waiting message includes the Waiting Duration Time. Upon receipt of such a waiting message, the mobile station suspends data transmission and then, after the time period set in the Waiting Duration Time field, resumes data transmission.

Referring to FIG. 7, the mobile station determines whether a message has been received from the base station in step 701. Upon receipt of a message, the mobile station determines whether the received message is a waiting message in step 702. If not, the mobile station performs whatever function the message indicates in step 706. If it is a waiting message in step 702, the mobile station suspends data transmission in step 703 and determines whether a time period set in the Waiting Duration Time field has elapsed in step 704. If the time period is over, the mobile station resumes the data transmission in step 705.

Figure 8:
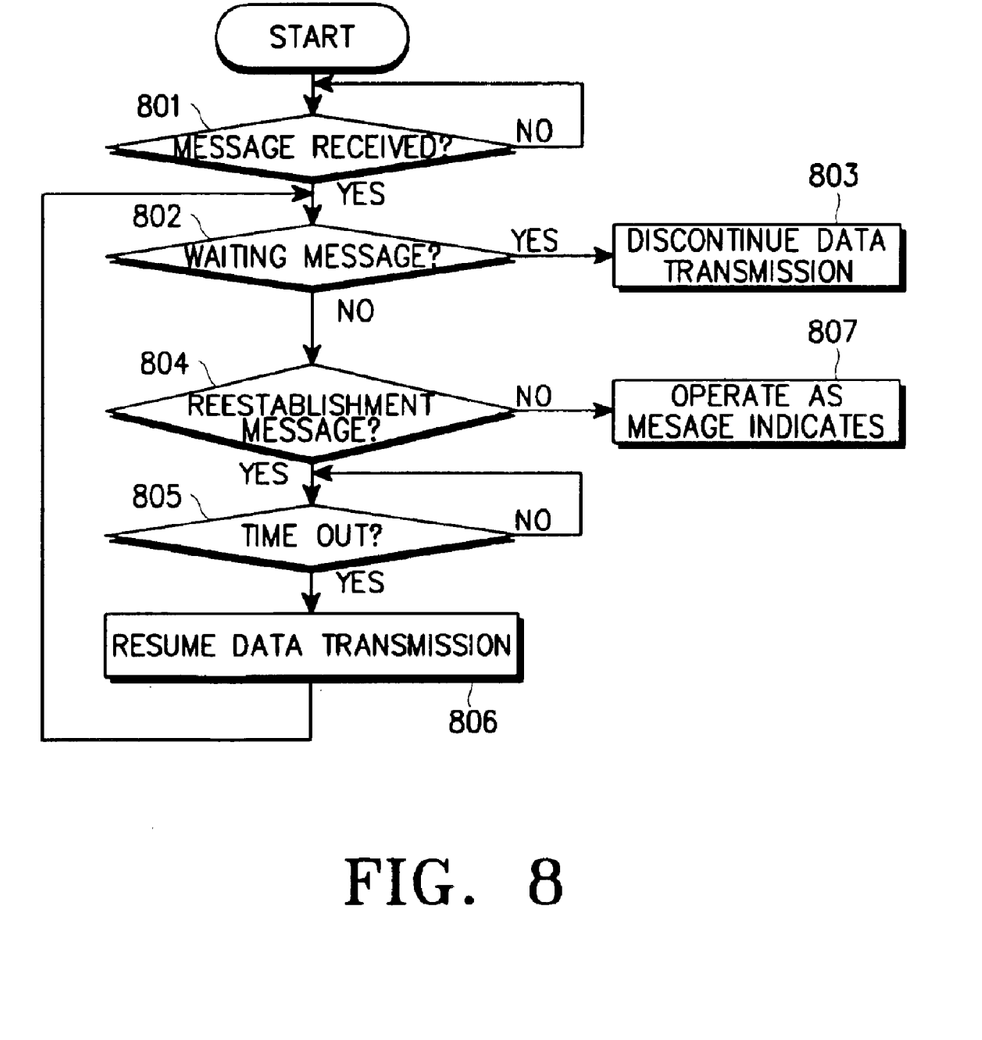
FIG. 8 is a flowchart illustrating a third embodiment of the message processing operation in the mobile station according to the present invention.

FIG. 8 is a third embodiment of the message processing operation in the mobile station according to the present invention. The third embodiment shows what happens when the Reestablishment Duration Time field is used in the reestablishment message, and the mobile station resumes data transmission after the time period set in the Reestablishment Duration Time field.

Referring to FIG. 8, the mobile station determines whether a message has been received from the base station in step 801. Upon receipt of a message, the mobile station determines whether the received message is a waiting message in step 802. If it is a waiting message, the mobile station suspends data transmission in step 803. If the received message is not the waiting message in step 802, it is determined whether the received message is a reestablishment message in step 804. If it is a reestablishment message, the mobile station enters a loop where it waits until the time period set in the Reestablishment Duration Time field elapses in step 805. When the time period is over, the mobile station resumes data transmission in step 806.

In accordance with the present invention as described above, upon request of a new call set-up, the base station checks available resources. If the available resources are not enough to satisfy the QoS of the requested call, a call in progress with a lower service level than the requested call is dropped temporarily and the requested call is connected instead. The dropped call is resumed when available resources are secured.

Therefore, the resources of the base station can be utilized and assigned efficiently according to the characteristics of the requested call and the QoS of the requested call is ensured. Furthermore, since the mobile station with the suspended call can resume the call with the base station upon receipt of a reestablishment message or after a predetermined time, interference with other channels is reduced and the lifetime of the mobile station's batteries is increased.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method of processing a call set-up request from a second mobile station in a base station of a mobile communication system, where the base station is servicing a call in progress of a first mobile station, comprising the steps of:

determining a service level of a call requested by the call set-up request, if the base station does not have enough available resources to accommodate the requested call;

if the service level of the requested call is higher than a service level of the call in progress of the first mobile station:

suspending the call in progress of the first mobile station;

accepting the call set-up request; and servicing the requested call of the second mobile station; and resuming by the first mobile station, data transmission after a predetermined time period.

2. The method of claim 1, further comprising the step of:

resuming the suspended call of the first mobile station if the base station secures enough resources to resume the suspended call of the first mobile station.

3. The method of claim 1, wherein the service level of the requested call is determined by considering both a mobile station priority of the second mobile station and a service priority of the requested call of the second mobile station.

4. The method of claim 1, wherein parameters for establishing a physical channel and service option information are stored in the first mobile station, said service option information being indicative of the characteristics of the application service of the suspended call.

5. A call processing method in a mobile communication system, where the mobile communication system has a first mobile station with a call in progress, a second mobile station, and a base station that serves both the first and second mobile stations, comprising the steps of:

receiving a call set-up request from a second mobile station;

determining a service level of a call requested by the call set-up request, if the base station does not have enough available resources to accommodate the requested call; and if the service level of the requested call is higher than a service level of the call in progress of the first mobile station:

transmitting, by the base station, a waiting message to the first mobile station;

discontinuing, by the first mobile station, data transmission in response to the waiting message;

accepting, by the base station, the requested call set-up;

servicing, by the base station, the requested call of second mobile station;

transmitting, by the base station, a reestablishment message to the first mobile station, if the base station secures enough resources to resume the suspended call; and resuming, by the first mobile station, data transmission in response to the reestablishment message.

6. The call processing method of claim 5, wherein the determining a service level step comprises:

considering a mobile station priority of the second mobile station and a service priority of the requested call of the second mobile station.

7. The call processing method of claim 5, wherein parameters for establishing a physical channel and service option information are stored in the first mobile station, said service option information being indicative of the characteristics of the application service of the suspended call.

8. The call processing method of claim 5, wherein the first mobile station resumes data transmission a predetermined time period after the first mobile station receives the reestablishment message.

9. The call processing method of claim 8, wherein the reestablishment message includes information about the predetermined time period.

10. A call processing method in a mobile communication system having a first mobile station with a call in progress, a second mobile station, and a base station that serves the first and second mobile stations, comprising the steps of:

receiving a call set-up request from a second mobile station;

determining a service level of a call requested by the call set-up request, if the base station does not have enough available resources to accommodate the requested call; and if the service level of the requested call is higher than a service level of the call in progress of the first mobile station:

transmitting, by the base station, a waiting message to the first mobile station;

discontinuing, by the first mobile station, data transmission in response to the waiting message;

accepting, by the base station, the requested call set-up;

servicing, by the base station, the requested call of second mobile station; and resuming, by the first mobile station, data transmission after a predetermined time period.

11. The call processing method of claim 10, wherein the determining a service level step comprises:

considering a mobile station priority of the second mobile station and a service priority of the requested call of the second mobile station.

12. The call processing method of claim 10, wherein parameters for establishing a physical channel and service option information are stored in the first mobile station, said service option information being indicative of the characteristics of the application service of the suspended call.

13. The call processing method of claim 10, wherein the waiting message includes information about the predetermined time period.

14. A mobile communication system, comprising:

a first mobile station with a call in progress to a base station;

a second mobile station that transmits a call set-up request to the base station; and the base station for, if the base station does not have enough available resources to accommodate the requested call, and if a service level of the requested call is higher than a service level of the call in progress of the first mobile station, suspending the call in progress from the first mobile station and for servicing the requested call of the second mobile station, and for resuming, by the first mobile station, data transmission after a predetermined time period.

15. The mobile communication system of claim 14, wherein the base station resumes the suspended call of the first mobile station if the base station secures enough resources to resume the suspended call of the first mobile station.

16. The mobile communication system of claim 14, wherein the base station resumes the suspended call of the first mobile station a predetermined time period after the call is suspended by the first mobile station.

17. The mobile communication system of claim 14, wherein the base station determines the service level of the requested call by considering a mobile station priority of the second mobile station and a service priority of the requested call of the second mobile station.

18. The mobile communication system of claim 14, wherein parameters for establishing a physical channel and service option information are stored in the first mobile station, said service option information being indicative of the characteristics of the application service of the suspended call.

19. A mobile communication system, comprising:

at least one first mobile station with a call in progress to a base station;

a second mobile station that transmits a call set-up request to the base station; and the base station for, if a service level of the requested call is higher than a service level of the at least one call in progress of the at least one first mobile station, and if the base station does not have enough available resource to accommodate the requested call, suspending the at least one call in progress with a lower service level, and for servicing the requested call of the second mobile station, and for resuming, by the first mobile station, data transmission after a predetermined time period.

20. The mobile communication system of claim 19, wherein the base station resumes at least one suspended call of at least one first mobile station with a suspended call, if the base station secures enough resources to resume the at least one suspended call of the at least one first mobile station with a suspended call.

21. The mobile communication system of claim 19, wherein the base station resumes the at least one suspended call of the at least one first mobile station after a predetermined time period.

22. The mobile communication system of claim 19, wherein the base station determines the service level of the requested call by considering a mobile station priority of the second mobile station and a service priority of the requested call of the second mobile station.

23. The mobile communication system of claim 19, wherein parameters for establishing a physical channel and service option information are stored in the at least one first mobile station, said service option information being indicative of the characteristics of the application service of the at least one suspended call.

* * * * *